(12) United States Patent
Capito et al.

(10) Patent No.: US 7,686,724 B2
(45) Date of Patent: Mar. 30, 2010

(54) TORQUE TRANSFER DEVICE WITH HYDROSTATIC TORQUE CONTROL SYSTEM

(75) Inventors: Russell T. Capito, Clarkston, MI (US); Curt D. Gilmore, Fenton, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 484 days.

(21) Appl. No.: 11/804,405

(22) Filed: May 17, 2007

(65) Prior Publication Data

US 2008/0287242 A1 Nov. 20, 2008

(51) Int. Cl.
*F16H 47/02* (2006.01)

(52) U.S. Cl. .............................. 475/93; 475/109; 192/61

(58) Field of Classification Search ................... 475/91, 475/93, 94, 104, 108, 109, 305
See application file for complete search history.

(56) References Cited

U.S. PATENT DOCUMENTS

| | | | |
|---|---|---|---|
| 1,793,650 A | | 2/1931 | Strawn |
| 2,743,628 A | | 5/1956 | Scharaffa |
| 5,358,454 A | | 10/1994 | Bowen et al. |
| 5,456,642 A | | 10/1995 | Frost |
| 5,564,992 A | * | 10/1996 | Cunningham ............... 475/257 |
| 5,820,504 A | * | 10/1998 | Geralde ........................ 475/177 |
| 5,971,881 A | * | 10/1999 | Jolliff ............................ 475/89 |
| 6,106,240 A | * | 8/2000 | Fischer et al. ............... 417/203 |
| 6,135,909 A | | 10/2000 | Keiser |
| 6,544,136 B2 | | 4/2003 | Duan |
| 6,663,527 B2 | | 12/2003 | Phelan et al. |
| 6,688,851 B2 | | 2/2004 | Phelan et al. |
| 6,702,701 B2 | | 3/2004 | Phelan et al. |
| 2003/0125157 A1 | | 7/2003 | Phelan et al. |
| 2004/0147354 A1 | | 7/2004 | Kilduff |

\* cited by examiner

*Primary Examiner*—Rodney H Bonck
*Assistant Examiner*—Edwin A. Young
(74) *Attorney, Agent, or Firm*—Harness, Dickey & Pierce, P.L.C.

(57) ABSTRACT

In one form, the present teachings provide a power transmission device that includes a rotatable input shaft, a rotatable output shaft and a ring gear fixed for rotation with the input shaft. A carrier is fixed for rotation with the output shaft. A pump assembly includes an inner rotor supported for rotation on the carrier and an outer rotor encompassing the inner rotor. The outer rotor is in driving meshed engagement with the ring gear. The pump provides pressurized fluid to one of first and second fluid ports. A flow restrictor is moveable to selectively restrict fluid flow relative to one of the first and second ports.

In another form, the present teachings provide a power transmission device with a ring gear and a carrier assembly that are coupled to first and second rotary members, respectively. The carrier assembly includes pump assemblies, each of which having a rotor pin, an inner rotor rotatably received on the rotor pin, and an outer rotor that is rotatably received over the inner rotor. The outer rotors have planet gear teeth that are meshingly engaged with teeth of the ring gear. First and second fluid conduits are coupled to first and second sides of the pump assemblies, respectively, to facilitate the flow of hydraulic fluid into and out of the pump assemblies when they are operated in a first rotational direction. A valve is coupled to at least one of the first and second fluid conduits. The valve has a valve element, which is movable between first and second positions, for controlling fluid flow through the valve.

23 Claims, 5 Drawing Sheets

TORQUE TRANSFER DEVICE WITH HYDROSTATIC TORQUE CONTROL SYSTEM

BACKGROUND AND SUMMARY

The present disclosure relates generally to a power transmission device operable to selectively transfer torque between first and second sets of drivable wheels of a vehicle. More particularly, the present disclosure is directed to a power transmission device with a hydrostatic torque control system.

Due to increased demand for four-wheel drive vehicles, power transmission systems are more frequently being incorporated into vehicle driveline applications for transferring drive torque to the wheels. Some vehicles include a power transmission device operably installed between the primary and secondary drivelines. Such power transmission devices are typically equipped with a torque transfer mechanism for selectively transferring drive torque from the primary driveline to the secondary driveline to establish a four-wheel drive mode of operation. At least one known torque transfer mechanism includes a dog-type lock-up clutch that may be selectively engaged for rigidly coupling the secondary driveline to the primary driveline when the vehicle is operated in the four-wheel drive mode. When the lock-up clutch is released, drive torque is delivered only to the primary driveline and the vehicle operates in a two-wheel drive mode.

Another type of power transmission device, referred to as a transfer case, may be operable to automatically direct drive torque to the secondary wheels without any input or action on the part of a vehicle operator. When traction is lost at the primary wheels, a four-wheel drive mode is entered. Some transfer cases are equipped with an electrically-controlled clutch actuator operable to regulate the amount of drive torque transferred through a friction clutch to a secondary output shaft. The actuator typically includes an electric motor to provide an application force to the friction clutch.

While many power transfer devices are currently used in four-wheel drive vehicles, a need exists to advance the technology. For example, packaging concerns, weight and electrical power requirements of the power transmission device may make such systems cost prohibitive in some four-wheel drive applications.

A power transmission device with a ring gear and a carrier assembly that are coupled to first and second rotary members, respectively. The carrier assembly includes pump assemblies, each of which having a rotor pin, an inner rotor rotatably received on the rotor pin, and an outer rotor that is rotatably received over the inner rotor. The outer rotors have planet gear teeth that are meshingly engaged with teeth of the ring gear. First and second fluid conduits are coupled to first and second sides of the pump assemblies, respectively, to facilitate the flow of hydraulic fluid into and out of the pump assemblies when they are operated in a first rotational direction. A valve is coupled to at least one of the first and second fluid conduits. The valve has a valve element, which is movable between first and second positions, for controlling fluid flow through the valve.

DRAWINGS

The present disclosure will become more fully understood from the detailed description and the accompanying drawings, wherein.

DETAILED DESCRIPTION

The following description of the preferred embodiment(s) is merely exemplary in nature and is in no way intended to limit the disclosure, its application, or uses.

The present disclosure is directed to a power transmission device that may be adaptively controlled for modulating the torque transferred between a rotatable input member and a rotatable output member. The torque transfer mechanism may be useful within motor vehicle drivelines and easily positioned at a variety of axial positions spaced apart from a driving axle assembly. Accordingly, while the present disclosure is hereinafter described in association with a specific structural embodiment for use in a driveline application, it should be understood that the arrangement shown and described is merely intended to illustrate an exemplary use.

Figure 1:
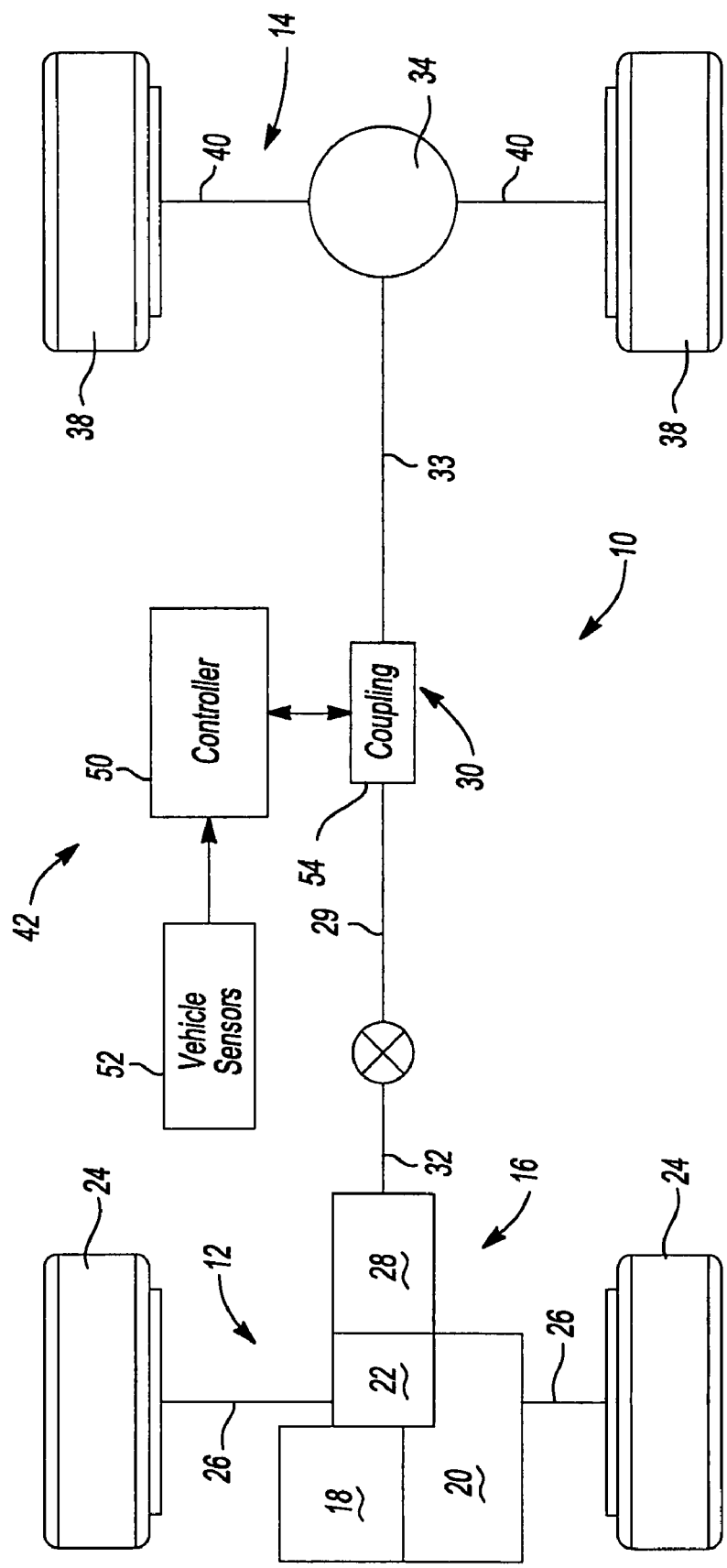
FIG. 1 is a schematic of a four-wheel drive vehicle equipped with a power transmission device of the present disclosure.

With reference to FIG. 1 of the drawings, a drive train 10 for a four-wheel vehicle is shown. Drive train 10 includes a first axle assembly 12, a second axle assembly 14 and a power transmission 16 for delivering drive torque to the axle assemblies. In the particular arrangement shown, first axle assembly 12 is the front driveline while second axle assembly 14 is the rear driveline. Power transmission 16 includes an engine 18 and a multi-speed transmission 20 having an integrated front differential unit 22 for driving front wheels 24 via axle shafts 26. A transfer unit or power take-off 28 is also driven by transmission 20 for delivering torque to an input member 29 of a coupling 30 via a driveshaft 32. The input member 29 of the coupling 30 is coupled to driveshaft 32 while its output member 33 is coupled to a drive component of a rear differential 34. Second axle assembly 14 also includes a pair of rear wheels 38 connected to rear differential 34 via rear axle shafts 40.

Drive train 10 is shown to include an electronically-controlled power transfer system 42 including coupling 30. Power transfer system 42 is operable to selectively provide drive torque in a two-wheel drive mode or a four-wheel drive mode. In the two-wheel drive mode, torque is not transferred via coupling 30. Accordingly, 100% of the drive torque delivered by transmission 20 is provided to front wheels 24. In the four-wheel drive mode, power is transferred through coupling 30 to supply torque to rear wheels 38. The power transfer system 42 further includes a controller 50 in communication with vehicle sensors 52 for detecting dynamic and operational characteristics of the motor vehicle. The controller 50 is operable to control actuation of coupling 30 in response to signals from vehicle sensors 52. The controller 50 may be programmed with a predetermined target torque split between the first and second sets of wheels. Alternatively, controller 50 may function to determine the desired torque to be transferred through coupling 30 via other methods. Regardless of the method used for determining the magnitude of torque to transfer, controller 50 operates coupling 30 to maintain the desired torque magnitude.

An alternative power transfer system incorporates coupling 30 without the use of controller 50. Control of coupling 30 may be accomplished using mechanical control devices as well. Accordingly, the control and function of coupling 30 may be accomplished without supply of electricity at all.

Figure 2:
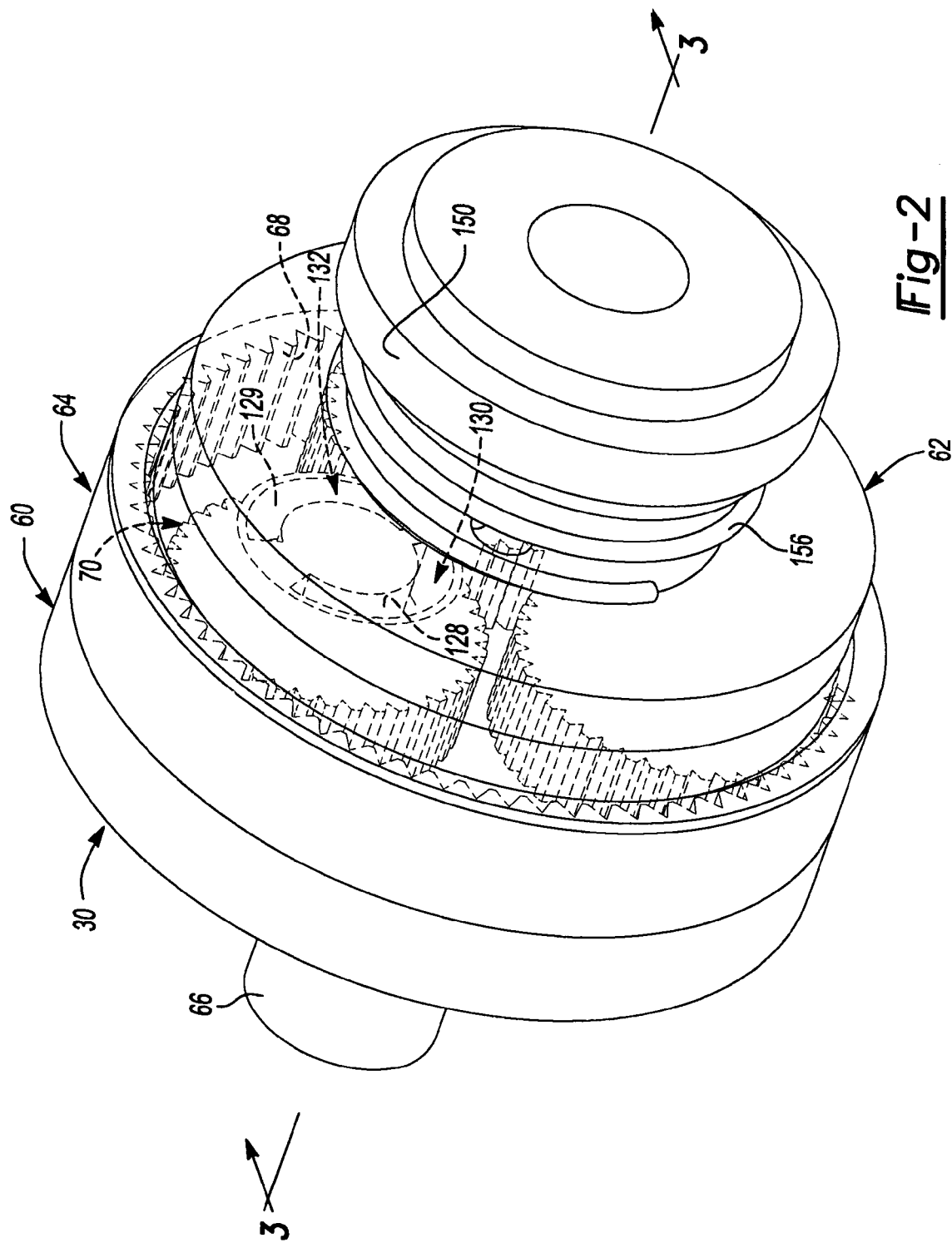
FIG. 2 is a perspective view of the power transmission device shown in FIG. 1.
Figure 3:
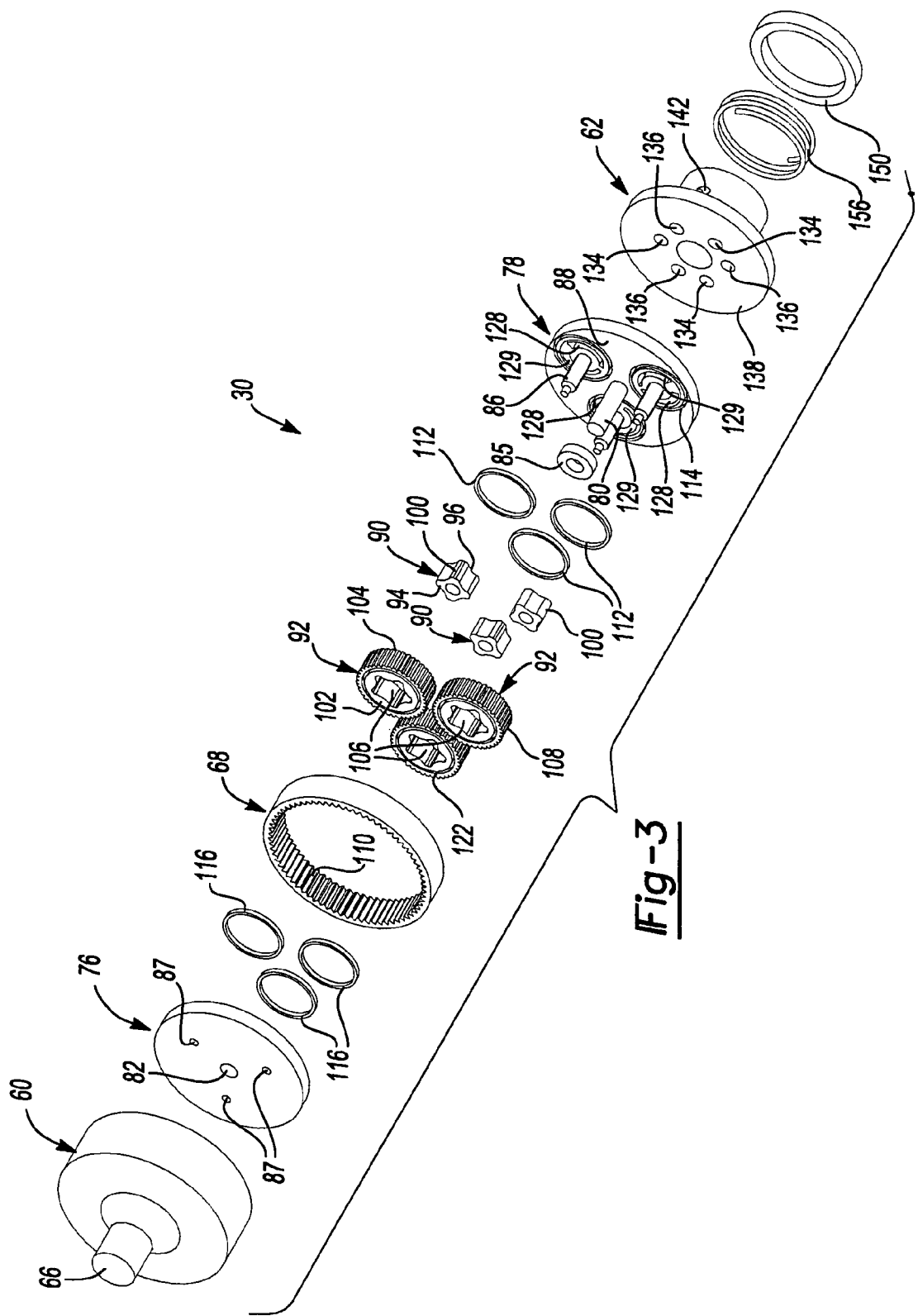
FIG. 3 is an exploded perspective view of the power transmission device shown in FIG. 2.
Figure 4:
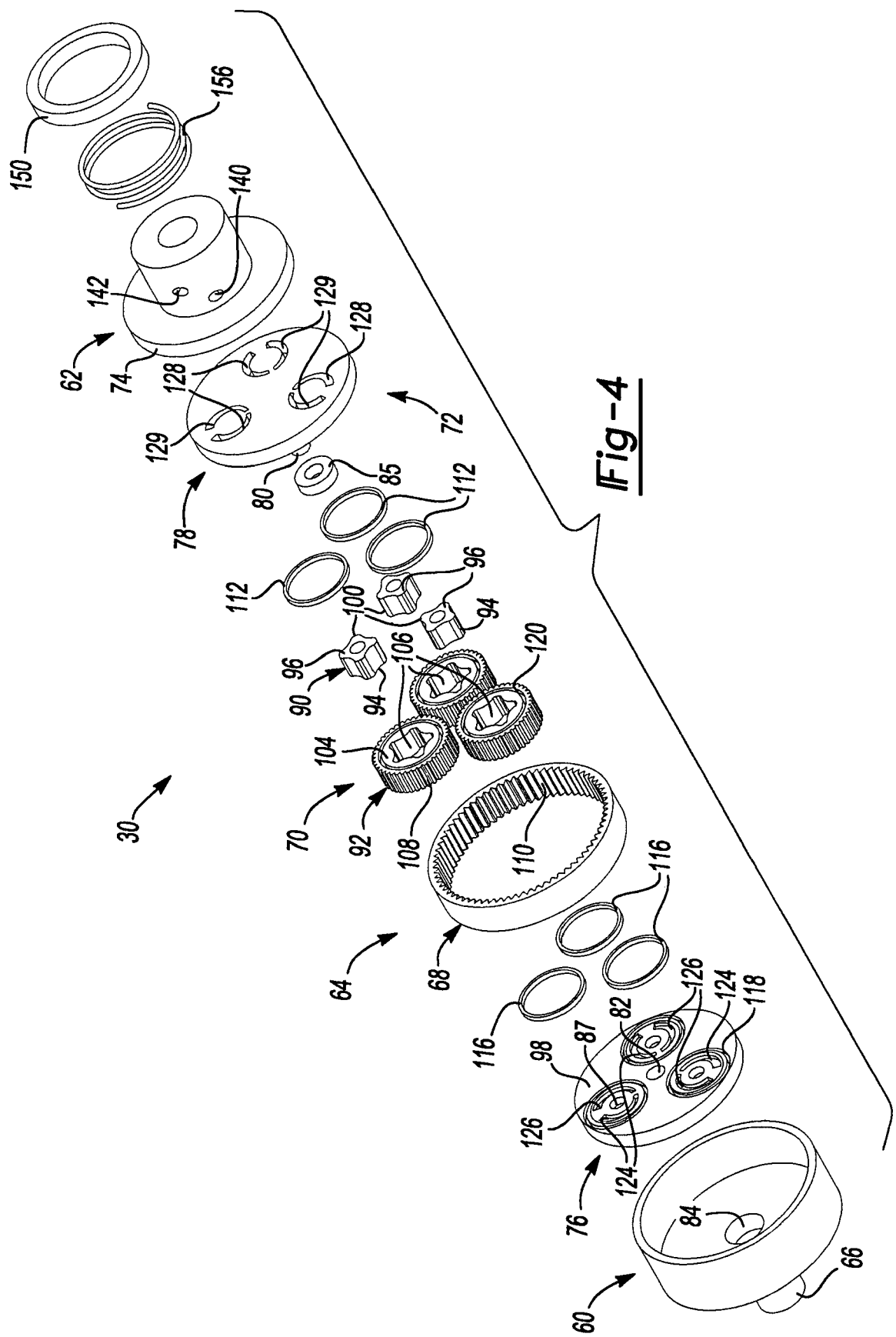
FIG. 4 is another exploded perspective view of the power transmission device taken at a different angle.
Figure 5:
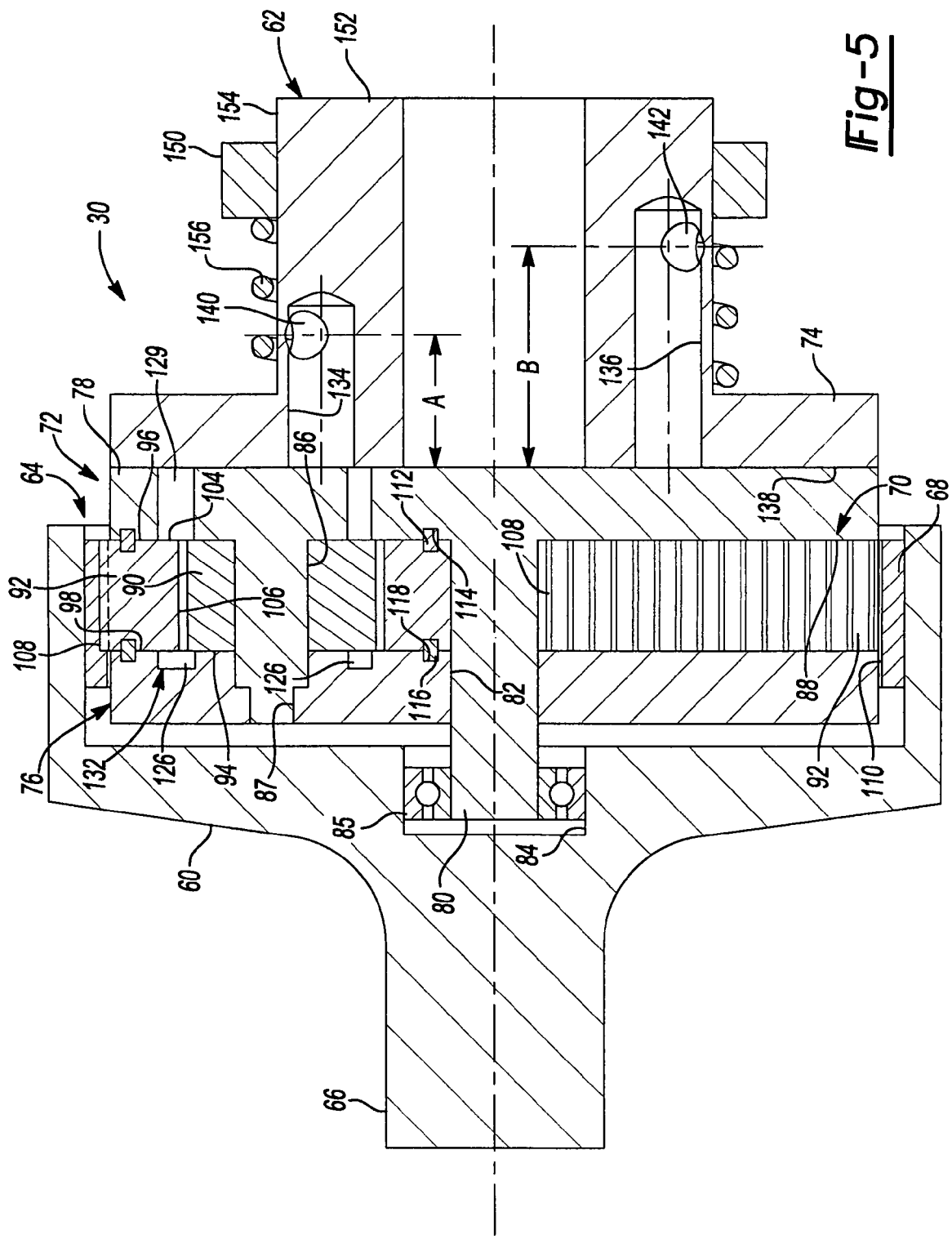
FIG. 5 is a cross-sectional side view of the power transmission device of the present disclosure.

FIGS. 2-4 depict coupling 30 in greater detail. Coupling 30 is positioned within a housing 54 (FIG. 1) containing a hydraulic fluid. Coupling 30 includes an input shaft 60 drivingly coupled to an output shaft 62 by a planetary gear set 64. One end 66 of input shaft 60 may include a coupling provision including an external spline for a driveline component such as driveshaft 32.

Planetary gear set 64 includes a ring gear 68 fixed for rotation with input shaft 60. A plurality of pump assemblies 70 are rotatably supported by a carrier assembly 72. Carrier assembly 72 is fixed for rotation with a flange 74 of output shaft 62. Carrier assembly 72 includes a first plate 76 and a second plate 78 fixed to one another. Second plate 78 includes a central pin 80 extending through a central aperture 82 formed in first plate 76. Central pin 80 extends beyond first plate 76 into a pocket 84 formed within input shaft 60. A bearing 85 rotatably supports central pin 80 within pocket 84. A plurality of rotor pins 86 axially extend from a sealing face 88 formed on second plate 78. First plate 76 may be fixed to rotor pins 86 by fasteners (not shown) extending through apertures 87 formed in first plate 76.

Each pump assembly 70 is substantially similar to the other. Accordingly, only one will be described in greater detail. Each pump assembly 70 is a gerotor-type pump having an inner rotor 90 and an outer rotor or pinion gear 92. Inner rotor 90 is rotatably supported on rotor pin 86. Inner rotor 90 includes a first face 94 and an opposing second face 96. First face 94 is placed in very close proximity with or possibly contacting a sealing face 98 of first plate 76. In similar fashion, second face 96 of inner rotor 90 is positioned in close proximity with or possible engagement with sealing face 88 of second plate 78. A plurality of lobes 100 are formed on an external surface of inner rotor 90.

Outer rotor 92 also includes first and second faces 102, 104 positioned substantially along the same planes as first and second faces 94, 96 of inner rotor 90, respectively. Outer rotor 92 includes a plurality of internal lobes 106 sized and shaped to receive lobes 100 of inner rotor 90 to define a gerotor pump. A plurality of gear teeth 108 are formed on an external surface of outer rotor 92. A plurality of gear teeth 110 formed on ring gear 68 are in meshed engagement with gear teeth 108 of each outer rotor 92.

Each rotor pin 86 is located at an eccentric axis relative to the axes of rotation of outer rotors 92. Guides 112 are partially positioned within grooves 114 formed on sealing face 88 to properly align outer rotors 92. Similarly, guides 116 are partially positioned within grooves 118 formed on sealing face 98. The guides 112, 116 are received within grooves 120, 122 formed on outer rotors 92 to accurately locate each outer rotor 92 for rotation along an axis offset from an axis of rotation of each inner rotor 90. Alternatively, guides 112 and 116 may be integrally formed into outer rotor 92.

First plate 76 includes three sets of first and second arcuately shaped blind cavities 124, 126. Second plate 78 includes three sets of first and second arcuately shaped through slots 128, 129. This arrangement defines three sets of first fluid ports 130 defined by cavities 124 and slots 128 and second fluid ports 132 defined by cavities 126 and slots 129. Based on a first direction of relative rotation between input shaft 60 and output shaft 62, first fluid ports 130 are low pressure or suction ports while second fluid ports 132 are high pressure or output ports of each pump assembly 70. When input shaft 60 is rotated relative to output shaft 62 in an opposite direction, second fluid ports 132 become the low pressure ports while first fluid ports 130 are the high pressure discharge ports.

Output shaft 62 includes a set of first passageways 134 in communication with first fluid ports 130 and a set of second passageways 136 in communication with second fluid ports 132. First passageways 134 partially extend through output shaft 62 from a first face 138 of output shaft 62 to first output shaft ports 140. In similar fashion, second passageways 136 extend from first face 138 to second output shaft ports 142. First output shaft ports 140 are formed at an axial location extending a first distance A from first face 138. Second output shaft ports 142 are positioned at a second distance B from first face 138. Distance B is greater than distance A.

A restrictor ring 150 circumscribes a substantially cylindrical portion 152 of output shaft 62. Restrictor ring 150 is configured to axially move relative to an outer surface 154 of cylindrical portion 152. Restrictor ring 150 is further configured to completely restrict, partially restrict or not restrict flow of fluid entering or exiting either of first and second passageways 134, 136. By controlling the axial location of restrictor ring 150 relative to first output shaft ports 140 and second output shaft ports 142, fluid flow within first passageways 134 and second passageways 136 may be controlled. Controlling the fluid flow through pump assemblies 70 controls a magnitude of torque transferred from input shaft 60 to output shaft 62.

The position of restrictor ring 150 may be controlled by controller 50 and an actuation mechanism (not shown). Depending on the information provided from vehicle sensors 52, controller 50 may initiate a request to transfer torque between input shaft 60 and output shaft 62. Alternatively, a vehicle user may directly make a torque transfer request. Based on the magnitude of torque to be transferred, controller 50 may cause the actuation mechanism to position restrictor ring 150 at a location partially restricting flow through either of first and second passageways 134, 136. Alternatively, flow through these passageways may be completely restricted or not restricted at all. A spring 156 may be positioned on cylindrical portion 152 of output shaft 62. Spring 156 functions to bias restrictor ring 150 toward a position where flow through first passageway 134 and second passageway 136 is not restricted. In this manner, a default mode of operating coupling 30 includes transferring little or no torque between input shaft 60 and output shaft 62.

One skilled in the art will be appreciate that it is contemplated to control the position of restrictor ring 150 by any number of methods including a purely mechanical method without requiring electrical input from a controller or an electric motor as well as other methods including actuators operable by provision of electrical power, hydraulic power or the like.

Furthermore, the foregoing discussion discloses and describes merely exemplary embodiments of the present disclosure. One skilled in the art will readily recognize from such discussion, and from the accompanying drawings and claims, that various changes, modifications and variations may be made therein without department from the spirit and scope of the disclosure as defined in the following claims.

What is claimed is:

1. A power transmission device comprising:
a rotatable input shaft;
a rotatable output shaft;
a ring gear fixed for rotation with said input shaft;
a carrier fixed for rotation with said output shaft;
a pump assembly including an inner rotor supported for rotation on said carrier and an outer rotor encompassing said inner rotor, said outer rotor being in driving meshed engagement with said ring gear, said pump providing pressurized fluid to one of first and second fluid ports; and a flow restrictor moveable to selectively restrict fluid flow relative to one of said first and second fluid ports.

2. The power transmission device of claim 1 wherein said carrier is restricted from rotating relative to said ring gear when said flow restrictor restricts fluid flow.

3. The power transmission device of claim 2 wherein said output shaft includes a first passageway terminating at said first fluid port and a second passageway terminating at said second fluid port.

4. The power transmission device of claim 3 wherein said first fluid port is located on an outer surface of a cylindrically shaped portion of said output shaft.

5. The power transmission device of claim 4 wherein said second fluid port is located on said outer surface of said cylindrically shaped portion of said output shaft.

6. The power transmission device of claim 5 wherein said first fluid port is positioned at a first axial location and said second fluid port is positioned at a second axial location offset from said first location.

7. The power transmission device of claim 6 wherein said flow restrictor is shaped as a ring surrounding a portion of said output shaft and moveable between positions where said first and second fluid ports are partially blocked, completely blocked and not blocked.

8. The power transmission device of claim 7 wherein said flow restrictor is biased toward a position where fluid flow is not restricted.

9. The power transmission device of claim 1 wherein a magnitude of torque transferred between said input shaft and said output shaft may be varied based on the position of said flow restrictor.

10. The power transmission of claim 9 further including a controller to control the position of said flow restrictor based on vehicle conditions and a request for torque transfer between said input shaft and said output shaft.

11. A power transmission device comprising:
a first rotary member;
a second rotary member;
a ring gear coupled to the first rotary member for rotation therewith, the ring gear comprising a plurality of ring gear teeth;
a carrier assembly coupled to the second rotary member for rotation therewith, the carrier assembly comprising a plurality of pump assemblies, each of the pump assemblies comprising a rotor pin, an inner rotor rotatably received on the rotor pin, and an outer rotor that is rotatably received over the inner rotor, each of the outer rotors having a plurality of planet gear teeth that are meshingly engaged with the ring gear teeth; and
a first fluid conduit coupled to a first side of the pump assemblies and adapted to couple a suction side of the pump assemblies to a supply of hydraulic fluid when the pump assemblies are operated in a first rotational direction;

a second fluid conduit coupled to a second side of the pump assemblies and adapted to receive pressurized fluid from the pump assemblies when the pump assemblies are operated in the first rotational direction; and a valve coupled to at least one of the first and second fluid conduits, the valve having a valve element for controlling fluid flow through the valve, the valve element being movable between a first position and a second position.

12. The power transmission device of claim 11 wherein the pump assemblies comprise gerotor-type pumps.

13. The power transmission device of claim 11 wherein the valve element is concentric with a rotational axis of the carrier assembly.

14. The power transmission device of claim 13 wherein the valve element is movable in an axial direction that is parallel to the rotational axis.

15. The power transmission device of claim 13 wherein the valve comprises a spring for biasing the valve element toward the first position.

16. The power transmission device of claim 15 wherein placement of the valve element in the first position configures the valve such that the valve element does not restrict fluid flow through the valve.

17. The power transmission device of claim 11 wherein the second fluid conduit is at least partly formed in the second rotary member.

18. The power transmission device of claim 17 wherein the valve element is mounted on the second rotary member.

19. The power transmission device of claim 17 wherein the carrier assembly comprises a plate member that abuts an axial side of the inner rotors and the outer rotors, and wherein a portion of the second fluid conduit is formed in the plate member.

20. The power transmission device of claim 19 wherein the carrier assembly comprises another plate that abuts an opposite axial side of the inner rotors and the outer rotors, and wherein a portion of the first fluid conduit is formed in the another plate member.

21. The power transmission device of claim 11 further comprising:
a third fluid conduit coupled to the second side of the pump assemblies and adapted to couple the suction side of the pump assemblies to the supply of hydraulic fluid when the pump assemblies are operated in a second rotational direction that is opposite the first rotational direction; and
a fourth fluid conduit coupled to the first side of the pump assemblies and adapted to receive pressurized fluid from the pump assemblies when the pump assemblies are operated in the second rotational direction.

22. The power transmission device of claim 21 wherein the valve is coupled to at least one of the third and fourth conduits.

23. The power transmission device of claim 22 wherein the second and fourth fluid conduits include respective fluid ports in the second rotary member.

* * * * *

UNITED STATES PATENT AND TRADEMARK OFFICE
CERTIFICATE OF CORRECTION

PATENT NO. : 7,686,724 B2  Page 1 of 3
APPLICATION NO. : 11/804405
DATED : March 30, 2010
INVENTOR(S) : Russell Capito et al.

It is certified that error appears in the above-identified patent and that said Letters Patent is hereby corrected as shown below:

In the Title Page

Item (57); Abstract:

"In one form, the present teachings provide a power transmission device that includes a rotatable input shaft, a rotatable output shaft and a ring gear fixed for rotation with the input shaft. A carrier is fixed for rotation with the output shaft. A pump assembly includes an inner rotor supported for rotation on the carrier and an outer rotor encompassing the inner rotor. The outer rotor is in driving meshed engagement with the ring gear. The pump provides pressurized fluid to one of first and second fluid ports. A flow restrictor is moveable to selectively restrict fluid flow relative to one of the first and second ports.

In another form, the present teachings provide a power transmission device with a ring gear and a carrier assembly that are coupled to first and second rotary members, respectively. The carrier assembly includes pump assemblies, each of which having a rotor pin, an inner rotor rotatably received on the rotor pin, and an outer rotor that is rotatably received over the inner rotor. The outer rotors have planet gear teeth that are meshingly engaged with teeth of the ring gear. First and second fluid conduits are coupled to first and second sides of the pump assemblies, respectively, to facilitate the flow of hydraulic fluid into and out of the pump assemblies when they are operated in a first rotational direction. A valve is coupled to at least one of the first and second fluid conduits. The valve has a valve element, which is movable between first and second positions, for controlling fluid flow through the valve."

should be

Signed and Sealed this

Thirty-first Day of August, 2010

David J. Kappos
*Director of the United States Patent and Trademark Office*

--A power transmission device with a ring gear and a carrier assembly that are coupled to first and second rotary members, respectively. The carrier assembly includes pump assemblies, each of which having a rotor pin, an inner rotor rotatably received on the rotor pin, and an outer rotor that is rotatably received over the inner rotor. The outer rotors have planet gear teeth that are meshingly engaged with teeth of the ring gear. First and second fluid conduits are coupled to first and second sides of the pump assemblies, respectively, to facilitate the flow of hydraulic fluid into and out of the pump assemblies when they are operated in a first rotational direction. A valve is coupled to at least one of the first and second fluid conduits. The valve has a valve element, which is movable between first and second positions, for controlling fluid flow through the valve.--.

Column 1, lines 46-60:

"A power transmission device with a ring gear and a carrier assembly that are coupled to first and second rotary members, respectively. The carrier assembly includes pump assemblies, each of which having a rotor pin, an inner rotor rotatably received on the rotor pin, and an outer rotor that is rotatably received over the inner rotor. The outer rotors have planet gear teeth that are meshingly engaged with teeth of the ring gear. First and second fluid conduits are coupled to first and second sides of the pump assemblies, respectively, to facilitate the flow of hydraulic fluid into and out of the pump assemblies when they are operated in a first rotational direction. A valve is coupled to at least one of the first and second fluid conduits. The valve has a valve element, which is movable between first and second positions, for controlling fluid flow through the valve."

should be

--In one form, the present teachings provide a power transmission device that includes a rotatable input shaft, a rotatable output shaft and a ring gear fixed for rotation with the input shaft. A carrier is fixed for rotation with the output shaft. A pump assembly includes an inner rotor supported for rotation on the carrier and an outer rotor encompassing the inner rotor. The outer rotor is in driving meshed engagement with the ring gear. The pump provides pressurized fluid to one of first and second fluid ports. A flow restrictor is moveable to selectively restrict fluid flow relative to one of the first and second ports.

In another form, the present teachings provide a power transmission device with a ring gear and a carrier assembly that are coupled to first and second rotary members, respectively. The carrier assembly includes pump assemblies, each of which having a rotor pin, an inner rotor rotatably received on the rotor pin, and an outer rotor that is rotatably received over the inner rotor. The outer rotors have planet gear teeth that are meshingly engaged with teeth of the ring gear. First and second fluid conduits are coupled to first and second sides of the pump assemblies, respectively, to facilitate the flow of hydraulic fluid into and out of the pump assemblies when they are operated in a first rotational direction. A valve is coupled to at least one of the first and second fluid conduits. The valve has a valve element, which is movable between first and second positions, for controlling fluid flow through the valve.--.

Column 4, line 46: After "will", delete "be".